United States Patent
Büstgens

(10) Patent No.: US 9,638,350 B2
(45) Date of Patent: May 2, 2017

(54) MICRO PILOT VALVE

(71) Applicant: Burkhard Büstgens, Gundelfingen (DE)

(72) Inventor: Burkhard Büstgens, Gundelfingen (DE)

(73) Assignee: Burkhard Büsrgens, Gundelfingen (DE)

( * ) Notice: Subject to any disclaimer, the term of this patent is extended or adjusted under 35 U.S.C. 154(b) by 34 days.

(21) Appl. No.: 14/390,059

(22) PCT Filed: Mar. 28, 2013

(86) PCT No.: PCT/DE2013/000166
§ 371 (c)(1),
(2) Date: Oct. 2, 2014

(87) PCT Pub. No.: WO2013/149610
PCT Pub. Date: Oct. 10, 2013

(65) Prior Publication Data
US 2015/0316172 A1    Nov. 5, 2015

(30) Foreign Application Priority Data
Apr. 3, 2012  (DE) .......................... 10 2012 006 658

(51) Int. Cl.
*F16K 11/044*  (2006.01)
*F16K 99/00*  (2006.01)
(Continued)

(52) U.S. Cl.
CPC ............ *F16K 99/0048* (2013.01); *B41J 2/04* (2013.01); *B41J 2/14282* (2013.01);
(Continued)

(58) Field of Classification Search
CPC ....... Y10T 137/7761; Y10T 137/86501; Y10T 137/8667–137/8671; Y10T 137/86815;
(Continued)

(56) References Cited

U.S. PATENT DOCUMENTS 3,152,612 A  * 10/1964 Avery ................... F16K 31/006
                                                    137/625.4
3,236,452 A  *  2/1966 Bordeaux ............. F01N 3/2053
                                                    137/110
(Continued)

FOREIGN PATENT DOCUMENTS

DE           19946833 A1     5/2001
DE       102007028673 B3     8/2003

OTHER PUBLICATIONS

International Search Report of PCT/DE2013/000166.

*Primary Examiner* — William McCalister

(57) ABSTRACT

The invention relates to a micro pilot valve 1, which is characterized by a micro cavity 2, which is connected with valve outlet 3, a first micro opening 4 between micro cavity 2 and a first pressure level 5, a second micro opening 6 between micro cavity 2 and a second pressure level 7, a sealing element 8 within micro cavity 2, which is movable between the micro openings, and which in a first end position closes micro opening 4 and in a second end position micro opening 6, whereas the control pressure in the first end position adopts the value of the second pressure level 7 and in the second end position the value of the first pressure level 5, and a micro actuator 10, which actuates sealing element 8 via a transfer element, which protrudes at least through one of the micro openings.

8 Claims, 3 Drawing Sheets

Figure 1:
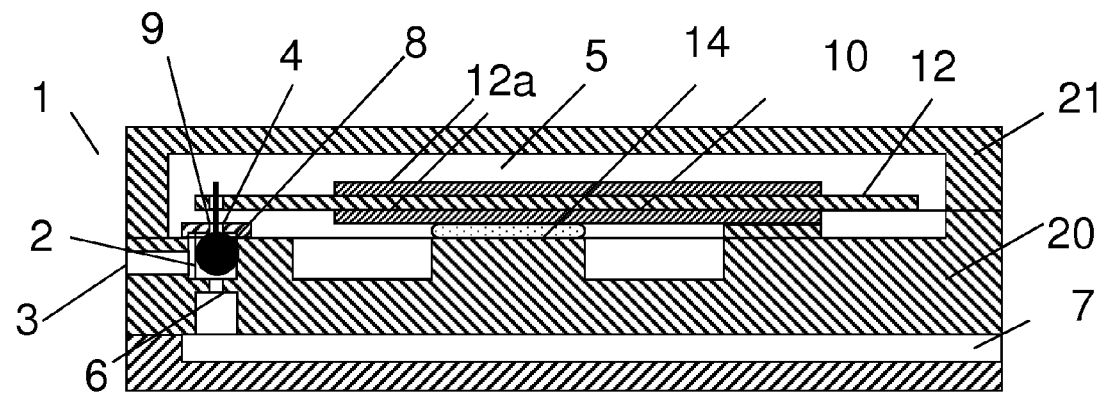

(51) Int. Cl.
*F16K 31/04* (2006.01)
*B41J 2/04* (2006.01)
*B41J 2/14* (2006.01)

(52) U.S. Cl.
CPC ......... *F16K 31/04* (2013.01); *B41J 2002/041* (2013.01); *B41J 2202/05* (2013.01); *Y10T 137/7761* (2015.04); *Y10T 137/8667* (2015.04); *Y10T 137/86501* (2015.04); *Y10T 137/86831* (2015.04); *Y10T 137/86879* (2015.04)

(58) Field of Classification Search
CPC ..... Y10T 137/86831; Y10T 137/86879; Y10T 137/86887; Y10T 137/86895; F16K 31/04; F16K 99/0048; B41J 2/04; B41J 2/14282; B41J 2002/041; B41J 2202/05
USPC .......................... 137/625.11, 625.25–625.69
See application file for complete search history.

(56) References Cited

U.S. PATENT DOCUMENTS

| | | | | |
|---|---|---|---|---|
| 3,776,277 A * | 12/1973 | Nagashima | ............ | H01H 35/24 137/625.27 |
| 4,688,602 A * | 8/1987 | Kitamura | ............ | B60H 1/0065 137/597 |
| 5,267,589 A * | 12/1993 | Watanabe | ........ | B60G 17/01941 137/625.27 |
| 5,309,943 A * | 5/1994 | Stevenson | ............... | B60T 8/369 137/625.5 |
| 5,343,894 A * | 9/1994 | Frisch | ..................... | F15B 5/003 137/625.44 |
| 5,445,185 A * | 8/1995 | Watanabe | ........ | B60G 17/01941 137/596.17 |
| 5,779,149 A * | 7/1998 | Hayes, Jr. | ............ | F02M 47/027 239/124 |
| 6,017,016 A * | 1/2000 | Jackson | .................... | F15C 3/14 251/129.06 |
| 6,076,555 A * | 6/2000 | Hettinger | .................. | F15C 5/00 137/625.65 |
| 6,164,621 A * | 12/2000 | Bouchard | ............ | F16K 31/006 251/129.06 |
| 6,170,526 B1 * | 1/2001 | O'Neill | ................. | F16K 31/007 137/625.65 |
| 6,526,864 B2 * | 3/2003 | Lindler | .................... | F16K 31/02 137/1 |
| 6,694,998 B1 * | 2/2004 | Hunnicutt | ................ | B60T 8/3695 137/116.3 |
| 6,705,347 B2 * | 3/2004 | Itzhaky | ................. | F16K 31/006 137/625.44 |
| 6,845,962 B1 * | 1/2005 | Barron | .................... | B60T 8/366 137/596.16 |
| 7,644,731 B2 * | 1/2010 | Benda | ...................... | F16K 1/42 137/625.33 |
| 7,717,132 B2 * | 5/2010 | Burkhart | ............... | F16K 31/025 137/625.65 |
| 2003/0164194 A1 * | 9/2003 | Lee | .................... | F15B 13/0405 137/625.65 |

\* cited by examiner

MICRO PILOT VALVE

The invention is directed to a micro pilot valve 1 with very short switching time. Pilot valves are used to amplify a small switching energy by use of a pneumatic pressure as an auxiliary energy to control processes, which require a higher switching energy.

A micro pilot valve of this category with very short switching time is for example applied within a pneumatically actuated printhead as in DE102009029946A1. The valve serves for generating a control pressure, which has to settle at two defined pressure values. For this a series circuit out of a micro valve and a pneumatic throttle element is used, which is arranged between two given supply pressure levels, whereas the resulting pressure level at the common node is used as a control pressure. While in the valve closed-state the pressure settles exactly at the level of a corresponding supply pressure, the pressure level will in the state of an open valve settle at a value between the supply pressure levels. Tolerances and smaller contaminations of the throttle have the effect of undesirable variations of the resulting control pressure. Further there is permanent air consumption in the case of an open valve.

A micro pilot valve is desirable with switching times smaller than 0.1 milliseconds to generate a control pressure, which exactly can comprise the pressure levels of both of two given supply pressure levels and which further does not comprise a permanent air consumption.

The task is accomplished by the pilot valve 1 according to the invention, which is characterized by a micro cavity 2, which is connected with valve outlet 3, a first micro opening 4 between micro cavity 2 and a first pressure level 5, a second micro opening 6 between micro cavity 2 and a second pressure level 7, a sealing element 8 within micro cavity 2, which is movable between the micro openings, and which in a first end position closes micro opening 4 and in a second end position micro opening 6, whereas the control pressure in the first end position adopts the value of the second pressure level 7 and in the second end position the value of the first pressure level 5, and a micro actuator 10, which actuates sealing element 8 via a transfer element, which protrudes at least through one of the micro openings.

The micro pilot valve 1 according to the invention overcomes the mentioned disadvantages of the prior art and is suited to generate a control pressure, which can settle exactly at two given supply pressure levels, enabling switching times smaller than 0.1 milliseconds and switching frequencies above 5 kHz. The valve according to the invention comprises a dead volume of only a few micro-liters, which essentially contributes to short switching times.

In a first embodiment of the invention micro pilot valves according to the invention are used within a multichannel printhead or dosing head according to patent application DE102009029946A1, which is hereby incorporated by reference into this application, to control pneumatically driven fluid ejectors, which apply viscous coating material, particularly thixotropic coating material in a non-contact way onto surfaces. The fluid ejectors are working according to the drop-on-demand method adopting a valve or displacement type functional principle.

In a second embodiment of the invention the micro pilot valves according to the invention are used within a multichannel printing head or dosing head according to DE102009029946A1 to control pneumatically driven fluid ejectors, whereby the fluid-ejectors are configured as pneumatically driven fluid- or gas valves and are used for fast switching of fluid and gas flows in hydraulic or pneumatic applications.

Consequently micro pilot valves 1 can be used to control pneumatically driven valves, which are used to hydraulically or pneumatically control fluids or gases, and which are used to control free fluid jets of gases or flowable material. Further an array of micro pilot valves 1 can be used to control an array of pneumatically driven valves, which are used to hydraulically or pneumatically control fluids or gases, and which are used to control free fluid jets of gases or flowable material. In summary, micro pilot valves 1 according to the invention are preferably used to actuate pneumatically actuated dispensing, dosing, drop-on-demand or switching valves or arrays of these.

Figure 2:
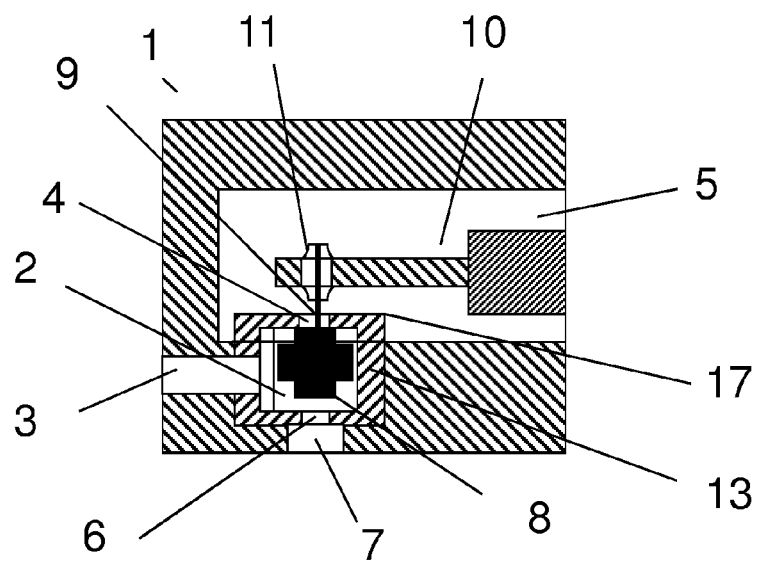

FIG. 1 shows a micro pilot valve 1 according to the invention, FIG. 2 the magnification of a detail with a variant. Centerpiece of the micro pilot valve 1 is sealing element 8, which is located within micro cavity 2, the micro cavity being connected with valve outlet 3, first micro opening 4, which is connected to a first supply pressure level 5, and with a second micro opening 6, which is connect to a second supply pressure level 7. Micro openings 4 and 6 in particular can be oriented co-axially. Micro cavity 2 can be integrated within substrate 20 or within the housing of the micro pilot valve 1, or alternatively can comprise a separately fabricated insert 13, which is embedded into substrate or housing 20 of micro pilot valve 1. Micro cavity 2 for example comprises a lid 17, which comprises micro opening 4. To achieve short switching times, the volume of micro cavity 2 is configured preferably small. Micro cavity 2 consequently has a volume of a few microliters. The diameters of micro openings 4 and 6 depend on the application and are between 0.1 mm and 0.5 mm or between 0.3 mm and 1 mm. Sealing element 8 is arranged with micro cavity 2 such, that it closes the first micro opening 4 in a first end position and closes the second micro opening 6 in second end position. The contact surfaces of the micro openings are identical with the valve seats of the as the corresponding valves. Consequently within the micro pilot valve 1 to micro valves at opposite positions relative to each other are actuated by a common sealing element 8 being located in between. Small leaks only have a small influence on the value of the control pressure at the valve outlet 3 and therefore are tolerable. The sealing between sealing element 8 and micro opening 4 or 6 can be based on a form fit of the involved sealing surfaces, i.e., on the valve seats. Sealing element 8 can be of arbitrary geometry. It can be freely movable within the micro cavity or it can be connected to the housing of the micro pilot valve or to the insert 13 or to substrate 20 by means of an elastic suspension. Sealing element 8 is for example a sphere, see FIG. 1, or a cylindrical part, the sealing surfaces of which being formed by the respective end faces, or a cylindrical part, see FIG. 2, the sealing surfaces of which for example comprise of a reduced diameter compared to the cylinder, for example in the form of a step or chamfer. The diameters of the two end faces are configured such, that a defined sealing width of for example 0.03 mm to 0.2 mm is given around the micro openings 4 and 6. In the first embodiment as mentioned above the diameter of the sealing element 8, for example of the sphere, is for example in the range of 0.3 mm to 1 mm.

Sealing element 8 is actuated by a micro actuator 10. The travel is typically in the range between 0.02 mm and 0.1 mm. Micro actuator 10 preferably is implemented as a piezo actuator, in particular as a bending actuator or piezo stack actuator. Suitable are also miniaturized electromagnetic or electro-dynamic actuators, which are configured for the mentioned actuator travel.

Figure 3A:
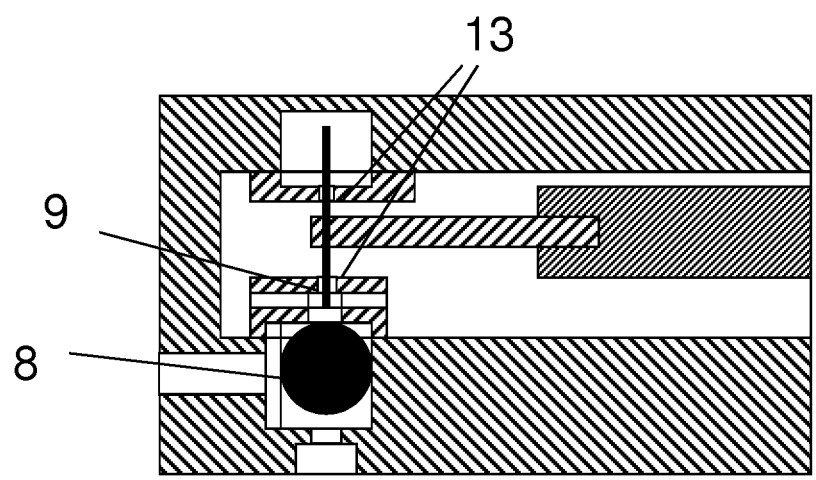
Figure 3B:
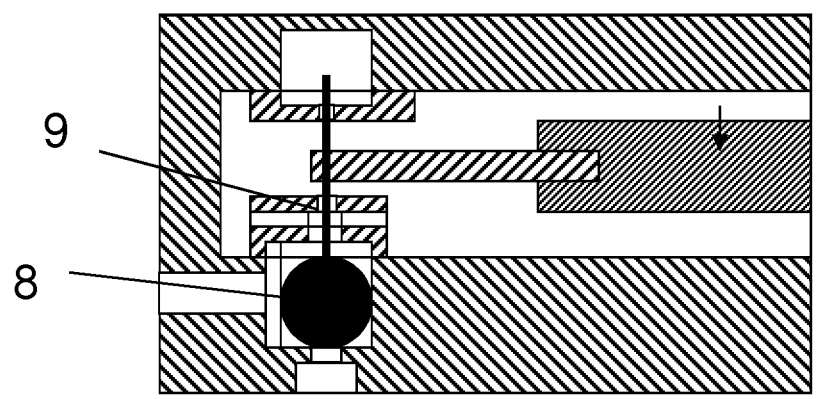

The transfer of the movement of the micro actuator 10 to the sealing element 8 is accomplished by a transfer element 9. This is preferably rigidly connected with micro actuator 10 or sealing element 8. It can also be a form feature of micro actuator 10 or sealing element 8. If transfer element 9 is rigidly connected with micro actuator 10, the joint 11 to the micro actuator 10 can be established by a bonding process (adhesive bonding, soldering, welding) after the steps of mounting micro cavity 2 and inserting sealing element 8. To make a rework of the alignment possible a releasable joint can be used. If only compressive forces are transmitted, there is no need for a fix joint. FIGS. 3a and 3b illustrate a variant, wherein the transfer element 9 is horizontally centered such, that it can supply a force centrally onto sphere 8.

Transfer element 9 protrudes through micro opening 4 and transmits the movement of micro actuator 10 onto the sealing element 8 through micro opening 4. This method of force transmission allows the volume of micro cavity 2 to be small, because micro cavity 2 only contains sealing element 8. A transfer element 9 protrudes through micro opening 4, it can be formed as a needle or a rod, with, depending on the diameter of micro opening 4, a diameter of 0.05 mm to 0.5 mm for example, and a length of 1 to 2 mm. A preferred embodiment of the transfer element 9 is an embodiment as a flat etched part, for example out of a plate material out of stainless steel or brass with a thickness of <0.1 mm.

In a variant micro actuator 10 is a piezo bending actuator comprising a substrate plate 12 with a thickness of 0.05 mm to 0.3 mm and one (=monomorph) or two (=bimorph) thin piezo plates 12a with a thickness of 0.1 mm to 0.3 mm. The transfer element 9 is connected to micro actuator 10 via joint 11 or it is an integrated part of micro actuator 10, for example an extension of substrate plate 12, bended by an angle of 90°.

In a variant the first pressure level 5 is lower than the second pressure level and micro opening 4 comprises a larger cross section than micro opening 6.

In a further variant the first pressure level 5 is lower than the second pressure level 7, micro opening 4 comprises a larger cross section than micro opening 6, further, micro opening 5 comprises a diameter between 100 micrometer and 300 micrometer and micro opening 4 a diameter between 200 micrometer and 500 micrometer.

Description of the functionality when assuming the use of a piezo bending actuator: Pressure level 7 shall be in the range of 0.5 to 30 bar, pressure level 5 at ambient pressure. So pressure level 5 also can comprise an under pressure. Sealing element 8 shall close micro opening 4 supported by pressure level 7, so as a consequence the control pressure at the valve outlet 3 equals pressure level 7. In this position actuator 10 can be configured, that transfer element 9 is in contact with or fixed to sealing element 8, or, that there is a distance between transfer element 9 and sealing element 8, see FIG. 3a. With an electrical excitation the actuator performs a downward actuation displacement at its movable end, which is transmitted via transfer element 9 through micro opening 4 onto sealing element 8. Actuator is configured to be able to press sealing element 8 onto micro opening 6 with a sufficient force, to close the opening against pressure level 7, see FIG. 3b. At the same time micro cavity 2 is vented via micro opening 4 and the control pressure at valve outlet 3 equals the pressure of pressure level 5, i.e. ambient pressure. In this configuration the valve is configured as a normally-open micro valve.

Figure 4:
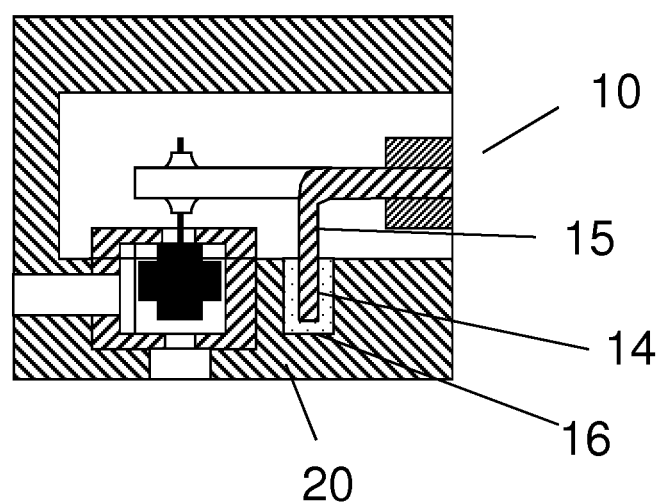

According to the invention it is proposed to dampen the movement of the micro actuator. In a damping gap 14 between a surface of the micro actuator 10 and a fixed surface of the housing 20 there is comprised a viscose liquid, preferably a silicone oil, see FIG. 1. The surfaces of the damping gap are directed perpendicular to the direction of displacement of the actuator 10, so a squeeze-film damping effect takes place. If surface are involved which are directed parallel to the direction of displacement of the actuator, a Coquette-flow takes place within the gap. FIG. 4 shows an example for this: Into a circular or elongated recess 16 of housing 20 a circular or flat protrusion 15 of micro actuator 10 is protruding. Protrusion 15 can also be a separate part, for example a bolt or plate, which is bonded, soldered or welded to the actuator. Damping gap 14, see FIG. 1, may be located for example between a surface of micro actuator 10 and a surface of substrate 20.

The invention claimed is:

1. Micro pilot valve (1) for generating a control pressure at a valve outlet (3), characterized by
   a micro cavity (2), which is connected to valve outlet (3)
   a first micro opening (4) in the cavity, which acts as a first valve seat and is connected to a first pneumatic pressure level (5),
   a second micro opening (6) in the cavity, which acts as a second valve seat and is connected to a second pneumatic pressure level (7),
   a sealing element (8) within micro cavity (2), which is movable between the micro openings, and which in a first position closes the first micro opening (4) and in a second position closes the second micro opening (6), wherein in the first position the control pressure adopts the value of the second pneumatic pressure level (7) and in the second position the value of the first pneumatic pressure level (5),
   and a micro actuator (10) outside the micro cavity, which actuates the sealing element (8) via a rod (9), which protrudes at least through one of the micro openings, wherein in the second position the rod (9) presses on the sealing element (8) whereas in the first position the rod (9) is lifted off from the sealing element (8).

2. Micro pilot valve according to claim 1, characterized in, that micro actuator (10) is designed as a piezo bending actuator.

3. Micro pilot valve according to claim 1, characterized in, that the first pneumatic pressure level (5) is lower than the second pneumatic pressure level (7) and that the first micro opening (4) comprises a larger cross section than the second micro opening (6).

4. Micro pilot valve according to claim 1, characterized in, that the first pneumatic pressure level (4) is lower than the second pneumatic pressure level (7), and that micro opening (4) comprises a larger cross section than micro opening (6), and that micro opening (6) comprises a diameter between 100 micrometer and 300 micrometer and micro opening (4) comprises a diameter between 200 micrometer and 500 micrometer.

5. Micro pilot valve according to claim 1, characterized in, that the first pneumatic pressure level (5) is lower than the second pneumatic pressure level (7) and transfer element (9) protrudes through micro opening (4).

6. Micro pilot valve according to claim 1, characterized in, that sealing element (8) is a sphere.

7. Micro pilot valve (1) according to claim 1, characterized in, that the valve outlet (3) is connected to a pneumatically controlled valve, which controls fluids or gases or discharges gaseous or liquid substances as a free jet.

8. A system characterized in that an array of micro pilot valves (1), each according to claim 7, actuates an array of pneumatically driven valves to control fluids and gases or to dose, dispense or free-jet apply gaseous or liquid substances.

\* \* \* \* \*